US010089721B2

(12) United States Patent
Takeda et al.

(10) Patent No.: US 10,089,721 B2
(45) Date of Patent: Oct. 2, 2018

(54) IMAGE PROCESSING SYSTEM AND METHOD FOR OBJECT BOUNDARY SMOOTHENING FOR IMAGE SEGMENTATION

(71) Applicant: SONY CORPORATION, Tokyo (JP)

(72) Inventors: Hiroyuki Takeda, San Jose, CA (US); Mohammad Gharavi-Alkhansari, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/259,175

(22) Filed: Sep. 8, 2016

(65) Prior Publication Data

US 2018/0068419 A1    Mar. 8, 2018

(51) Int. Cl.
*G06K 9/00* (2006.01)
*G06T 5/00* (2006.01)
*G06T 7/00* (2017.01)

(52) U.S. Cl.
CPC ............ *G06T 5/002* (2013.01); *G06T 7/0083* (2013.01); *G06T 7/0085* (2013.01)

(58) Field of Classification Search
None
See application file for complete search history.

(56) References Cited

U.S. PATENT DOCUMENTS

| 6,721,446 B1 * | 4/2004 | Wilensky | G06K 9/342 345/613 |
| 7,630,543 B2 * | 12/2009 | Wilensky | G06K 9/342 382/162 |
| 7,660,463 B2 * | 2/2010 | Blake | G06K 9/00624 382/173 |
| 8,089,548 B2 * | 1/2012 | Ogura | G06T 7/194 348/222.1 |
| 8,155,448 B2 * | 4/2012 | Ida | G06T 7/13 382/199 |
| 8,351,654 B2 * | 1/2013 | Criminisi | G06T 11/001 382/109 |

(Continued)

FOREIGN PATENT DOCUMENTS

WO    2014/159726 A    10/2014

OTHER PUBLICATIONS

Choi et al., "Combining histogram-wise and pixel-wise matchings for kernel tracking through constrained optimization", Computer Vision and Image Understanding 119 (2014) 61-70.*

(Continued)

*Primary Examiner* — Soo Park
(74) *Attorney, Agent, or Firm* — Chip Law Group

(57) ABSTRACT

Various aspects of an image processing system and method for object boundary smoothening for image segmentation, includes receipt of a user input to enable selection of a foreground object in an input color image. A frequency of occurrence of foreground pixels with respect to background pixels is determined for a plurality of pixels within a local pixel analysis window. The local pixel analysis window is positioned in a first region of the input color image to encompass at least a first pixel to be validated for a correct mask value. A first cost value and a second cost value is selected for the first pixel based on the determined frequency of occurrence of the foreground pixels. An object boundary is generated for a portion of the foreground object based on the selected first cost value and the second cost value for the first pixel.

26 Claims, 11 Drawing Sheets

(56) References Cited

U.S. PATENT DOCUMENTS

| | | | |
|---|---|---|---|
| 8,411,986 B2 | 4/2013 | Ip et al. | |
| 8,437,054 B2 * | 5/2013 | Campbell | G06K 9/342 |
| | | | 348/147 |
| 8,437,570 B2 * | 5/2013 | Criminisi | G06K 9/342 |
| | | | 382/173 |
| 8,620,076 B2 * | 12/2013 | Omori | G06K 9/4647 |
| | | | 382/170 |
| 8,655,069 B2 * | 2/2014 | Rother | G06K 9/34 |
| | | | 382/159 |
| 8,810,648 B2 * | 8/2014 | Bibby | G06T 7/149 |
| | | | 348/135 |
| 9,171,222 B2 * | 10/2015 | Ishii | H04N 5/232 |
| 9,299,005 B2 * | 3/2016 | Kim | G06K 9/48 |
| 9,495,755 B2 * | 11/2016 | Wang | G06T 7/194 |
| 2004/0008886 A1 * | 1/2004 | Boykov | G06K 9/342 |
| | | | 382/173 |
| 2006/0221090 A1 * | 10/2006 | Takeshima | G06T 7/11 |
| | | | 345/582 |
| 2012/0075440 A1 * | 3/2012 | Ahuja | G06T 7/11 |
| | | | 348/61 |
| 2014/0212037 A1 * | 7/2014 | Sasaki | G06T 7/408 |
| | | | 382/167 |
| 2016/0078630 A1 | 3/2016 | Steinberg et al. | |

OTHER PUBLICATIONS

Nikolas Moya et al., "Differential and Relaxed Image Foresting Transform for Graph-Cut Segmentation of Multiple 3d Objects", Medical Image Computing and Computer-Assisted Intervention—MICCAI 2014, vol. 8673 of the series Lecture Notes in Computer Science, 2014, pp. 7.

* cited by examiner

IMAGE PROCESSING SYSTEM AND METHOD FOR OBJECT BOUNDARY SMOOTHENING FOR IMAGE SEGMENTATION

CROSS-REFERENCE TO RELATED APPLICATIONS/INCORPORATION BY REFERENCE

None.

FIELD

Various embodiments of the disclosure relate to image processing. More specifically, various embodiments of the disclosure relate to an image processing system and method for object boundary smoothening for image segmentation.

BACKGROUND

Recent advancements in the field of video surveillance systems, machine vision systems in the field of robotics and automotive industry, and consumer electronic (CE) devices is largely due to rapid technological development in image processing techniques. One of such image processing techniques is image segmentation that may refer to partitioning of an image into several regions based on certain rules. Although various segmentation methods have been known to separate foreground objects from background of an image, the complexity, accuracy, and computational resource requirement varies based on an objective to be achieved. For example, it may be comparatively simple to segment a foreground object with prior knowledge of the shape or size of the foreground object. In certain scenarios, without knowing the size, shape, and/or the number of colors related to a foreground object, the segmentation becomes a challenging problem. Further, the problem is increased manifold if there are multiple objects with same or similar size, shape, and/or colors in an image, and one of them needs to be segmented. In such scenarios, current image segmentation approaches may either fail to segment or output a segmented foreground object with a rough boundary, which may not be visually appealing to a viewer. Therefore, an improved technique and system may be required for fast object boundary smoothening for precise segmentation of a foreground object.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An image processing system and method for object boundary smoothening for image segmentation is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
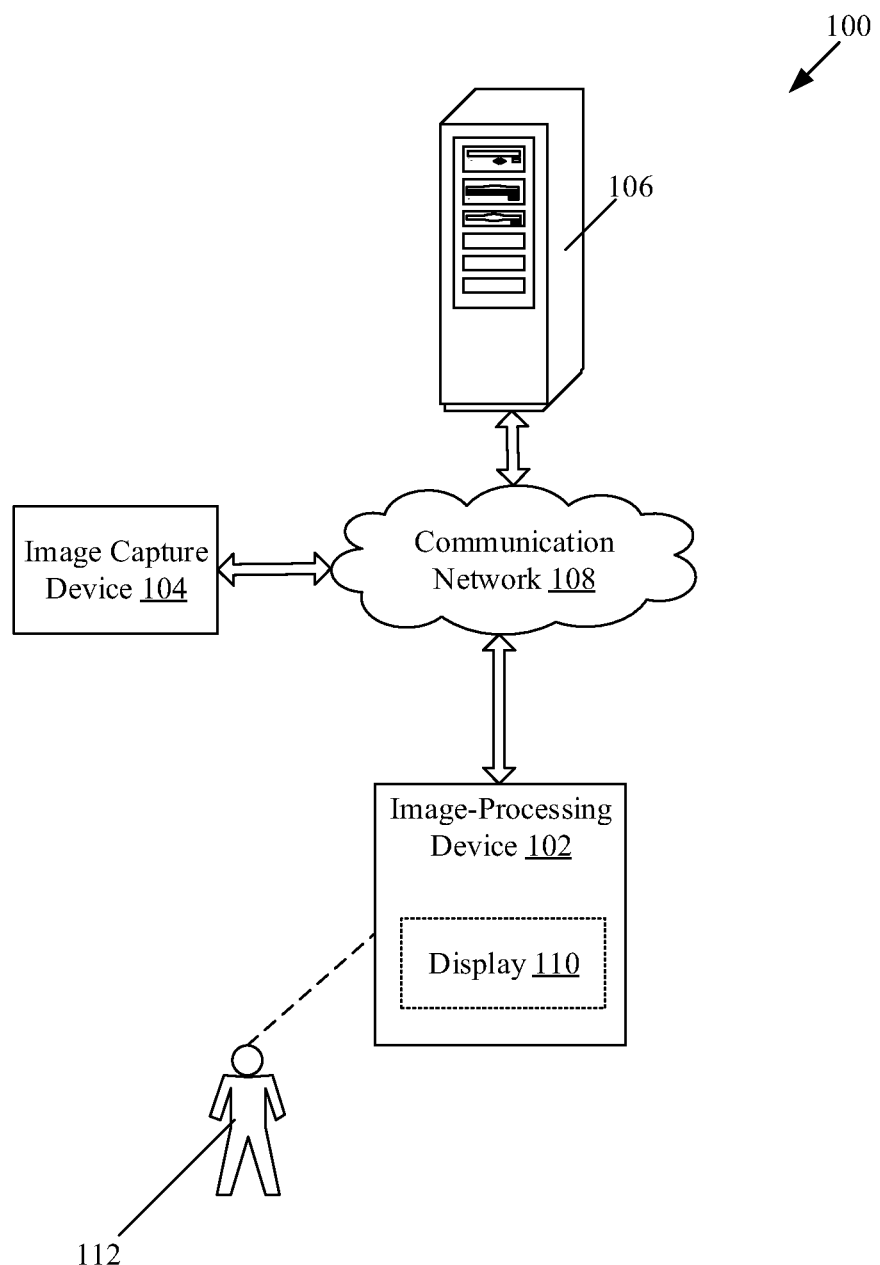
FIG. 1 is a block diagram that illustrates a network environment, in accordance with an embodiment of the disclosure.

Various implementations may be found in an image processing system and method for object boundary smoothening for image segmentation. Exemplary aspects of the disclosure may include a method to receive, by an image-processing device, a user input to enable selection of a foreground (FG) object in an input color image. A frequency of occurrence of FG pixels may be determined with respect to background (BG) pixels for a plurality of pixels within a local pixel analysis window of a specified size in the input color image. The local pixel analysis window may be positioned in a first region of the input color image to encompass at least a first pixel to be validated for a correct mask value corresponding to BG or FG. A first cost value and a second cost value may be selected for the first pixel based on the determined frequency of occurrence of the FG pixels with respect to the BG pixels for the plurality of pixels. An object boundary may be generated for a portion of the FG object, based on at least the selected first cost value and the second cost value for the first pixel.

In accordance with an embodiment, a candidate FG region boundary and a candidate BG region boundary may be estimated in the input color image based on the user input. The first region may correspond to a region located within the candidate FG region boundary and/or the candidate BG region boundary. In accordance with an embodiment, the candidate FG region boundary may comprise the FG object and may be located within the candidate BG region boundary. In other words, the candidate BG region boundary may surround the candidate FG region boundary.

In accordance with an embodiment, a size and a shape of the FG object, and/or color information of pixels around the user input extending to a periphery of the estimated candidate FG region boundary may be estimated. The local pixel analysis window may be a moving window of the specified size to analyze different pixels in at least the first region in the input color image. The local pixel analysis window may be positioned in the first region of the input color image to encompass the first pixel to be validated for the correct mask value corresponding to BG or FG. In accordance with an embodiment, a first mask value may be identified to be updated to a second mask value for each pixel located in the first region using the local pixel analysis window for the generation of the object boundary for the selected FG object.

The first mask value and the second mask value may correspond to one of a FG mask value and a BG mask value.

In accordance with an embodiment, the first cost value and the second cost value may be selected for the first pixel based on the determined frequency of occurrence of the FG pixels with respect to the BG pixels for the plurality of pixels. In accordance with an embodiment, the first cost value may correspond to a cost of mislabeling a flag value of the first pixel as FG in an event that the BG is true. Similarly, the second cost value may correspond to a cost of mislabeling a flag value of the first pixel as BG in an event that the FG is true. The second cost value may be selected larger than the first cost value to increase likelihood that the first pixel is categorized as FG. Such selection may occur in an event that the determined frequency of occurrence of FG pixels is larger with respect to BG pixels in the local pixel analysis window. In accordance with an embodiment, the second cost value is selected smaller than the first cost value to increase likelihood that the first pixel is categorized as BG in an event that the determined frequency of occurrence of FG pixels is smaller with respect to BG pixels in the local pixel analysis window. In accordance with an embodiment, a sigmoid function may be applied for the selection of the first cost value and the second cost value for each pixel in the first region using the local pixel analysis window to obtain a complete object boundary of the selected FG object.

In accordance with an embodiment, the object boundary may be generated for the portion of the FG object, based on the selected first cost value and the second cost value for at least the first pixel. The generated object boundary may represent a smoothened object boundary for the portion, as discussed above, and other portions of the FG object as a result of the selection of the first cost value and the second cost value for each pixel in the first region using the local pixel analysis window. In accordance with an embodiment, the selected FG object may be dynamically segmented from a BG of the input color image using the generated object boundary and a classifier.

FIG. 1 is a block diagram that illustrates a network environment, in accordance with an embodiment of the disclosure. With reference to FIG. 1, there is shown a network environment 100. The network environment 100 may include an image-processing device 102, an image capture device 104, a server 106, and a communication network 108. In accordance with an embodiment, the image-processing device 102 may include a display 110. The image-processing device 102 may be associated with a user 112. The image-processing device 102 may be communicatively coupled to the image capture device 104 and the server 106, via the communication network 108.

The image-processing device 102 may comprise suitable logic, circuitry, interfaces, and/or code that may be configured to receive one or more images or video from the image capture device 104 or the server 106, via the communication network 108. Examples of the image-processing device 102 may include, but are not limited to, at least one of a digital camera, a video surveillance device, an electronic control unit (ECU) of a vehicle, a computing device, a projector, a server, an augmented reality-, mixed reality-, or virtual reality-based display device or a wearable device, such as smart-glass or a head-mounted device, a laptop, a smartphone, a tablet device, a surgical system, a television, a gaming device, and/or other image-processing devices.

The image capture device 104 may comprise suitable logic, circuitry, interfaces, and/or code that may be configured to capture one or more images or video. Further, the image capture device 104 may be configured to transmit the captured one or more images or video, such as a color image as an input to the image-processing device 102 for processing, via the communication network 108. Examples of the image capture device 104 may include, but not limited to at least a camera, a camcorder, and an action cam. In accordance with an embodiment, the image capture device 104 may be implemented as an in-built unit of the image-processing device 102 or as a separate device.

The server 106 may comprise suitable logic, circuitry, interfaces, and/or code that may be configured to communicate images and/or video to the image-processing device 102. The server 106 may be implemented by use of several technologies that are well known to those skilled in the art. Examples of the server 106 may include, but are not limited to, at least one of a media streaming server, a cloud server, a broadcast server, an application server, a database server, a web server, a file server, or a combination thereof.

The communication network 108 may include a communication medium through which the image-processing device 102, the image capture device 104, and the display 110 may communicate with each other. Examples of the communication network 108 may include, but are not limited to, at least one of the Internet, a cloud network, a Long Term Evolution (LTE) network, a Wireless Fidelity (Wi-Fi) network, a wireless personal area network (WPAN), a Wireless Local Area Network (WLAN), a Local Area Network (LAN), a wireless wide area network (WWAN), a telephone line (POTS), or a Metropolitan Area Network (MAN), or a combination thereof. Various devices in the network environment 100 may be operable to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), Hypertext Transfer Protocol Secure (HTTPS), File Transfer Protocol (FTP), Zigbee, EDGE, infrared (IR), IEEE 802.11, 802.16, cellular communication protocols, and/or Bluetooth (BT) communication protocols.

The display 110 may comprise suitable logic, circuitry, interfaces, and/or code that may be configured to render the input color image received from the image capture device 104. The display 110 may be further configured to render the candidate FG region boundary, the candidate BG region boundary, local pixel analysis window, the object boundary generated for the portion of the FG object. Examples of the display 110 may include, but are not limited to, a display screen, a television (TV), a laptop, a tablet computer, a smartphone, an augmented reality display, and/or an optical head-mounted display device.

In operation, the image capture device 104 may be configured to capture an input color image. The input color image may include one or more objects, such as human and/or non-human objects (animate and/or inanimate). In accordance with an embodiment, the image capture device 104 may be an integrated unit in the image-processing device 102. Alternatively, in accordance with an embodiment, the image capture device 104 may be an external device communicatively coupled to the image-processing device 102, via the communication network 108. In such an embodiment, the image capture device 104 may be configured to transmit the captured input color image to the image-processing device 102, via the communication network 108. The image-processing device 102 may be configured to render the input color image received from the image capture device 104 on the display 110. The user 112 may desire to segment a FG object from the input color image. The user 112 may provide an input to a certain point on the FG object of the input color image rendered on the display 110. The point on the FG object where the user 112 provides the input, such as a single touch or click input, may be referred to as a user-selected point.

The image-processing device 102 may be configured to receive the user input to enable selection of the FG object in the input color image to be segmented out. Based on the user-selected point on the FG object, the image-processing device 102 may be configured to estimate a candidate FG region boundary and a candidate BG region boundary in the input color image. The candidate FG region boundary may include the FG object. An example of the candidate FG region boundary surrounded by the candidate BG region boundary is shown in FIG. 3B.

The image-processing device 102 may be configured to utilize a local pixel analysis window to analyze different pixels in a certain region in the input color image. The local pixel analysis window may be a moving window of a specified size, such as a "11×11", "5×5", or "n×n" pixels window, where n is a natural number greater than 2. The image-processing device 102 may be configured to determine a frequency of occurrence of FG pixels with respect to BG pixels for a plurality of pixels within the local pixel analysis window in the input color image. The local pixel analysis window may be positioned in a first region of the input color image. The first region may correspond to the region located within the candidate FG region boundary and/or the candidate BG region boundary. The local pixel analysis window may be positioned in the first region to encompass at least a first pixel to be validated for the correct mask value corresponding to BG or FG. The first pixel may be the unknown pixel "x", which need to be evaluated for the correct mask value, i.e. whether the first pixel belongs to BG pixel or a FG pixel of the object. The local pixel analysis window may then be positioned in other regions (not previously positioned) of the input color image until all the pixels within the candidate FG region boundary and/or the candidate BG region boundary are validated for the correct mask value. The mask value may also be referred to as a flag value, such as BG or FG.

The image-processing device 102 may be configured to select a first cost value and a second cost value for the first pixel based on the determined frequency of occurrence of the FG pixels with respect to the BG pixels for the plurality of pixels. The first cost value may correspond to the cost of mislabeling the flag value of the first pixel as FG in an event that the BG is true. The second cost value corresponds to a cost of mislabeling a flag value of the first pixel as BG in an event that the FG is true. The first cost value and the second cost value may be selected for the first pixel based on the determined frequency of occurrence of the FG pixels with respect to the BG pixels for the plurality of pixels. It is statistically reasonable to estimate that the first pixel, such as the unknown pixel "x", is likely FG if there are many FG pixels around it. Thus, the second cost value may be selected larger than the first cost value to increase the likelihood that the first pixel is categorized as FG in an event that the determined frequency of occurrence of FG pixels is larger with respect to BG pixels in the local pixel analysis window. For example, the second cost value may be selected as 1 or 0.8, whereas the first cost value may be selected as 0 or 0.2 to increase the likelihood that the first pixel is categorized as FG. Similarly, the second cost value may be selected smaller than the first cost value to increase the likelihood that the first pixel is categorized as BG in an event that the determined frequency of occurrence of FG pixels is smaller with respect to BG pixels in the local pixel analysis window. For example, the second cost value may be selected as 0 or 0.2, whereas the first cost value may be selected as 1 or 0.8 to increase the likelihood that the first pixel is categorized as BG. Once the segmentation is started, it may be automatically decided, which region the pixels within the candidate FG object boundary and/or the candidate BG boundary belong to, either the FG or the BG. An example of the selection of the cost values is further described in details in FIGS. 3D and 3E.

The image-processing device 102 may be configured to generate an object boundary for a portion of the FG object, based on at least the selected first cost value and the second cost value for the first pixel. The generated object boundary may represent a smoothened object boundary for the portion of the FG object as a result of the selection of the first cost value and the second cost value. Similarly, the first cost value and the second cost value may be selected for each pixel within the candidate FG object boundary and/or the candidate BG boundary using the local pixel analysis window. In accordance with an embodiment, appropriate cost values, such as the first cost value and the second cost value, are selected during segmentation process, as described above. Such selection of cost values locally using the local pixel analysis window, the image-processing device 102 becomes capable of smoothing the object boundary accurately and at a faster computation time. The image-processing device 102 may be configured to generate the object boundary for the entire FG object, based on such selection of cost values. The selected FG object may be dynamically segmented from the BG of the input color image using the generated object boundary. The object located around the point selected by the user 112 may be segmented instantly, by use of a single user input. No additional user-inputs may be requested.

Figure 2:
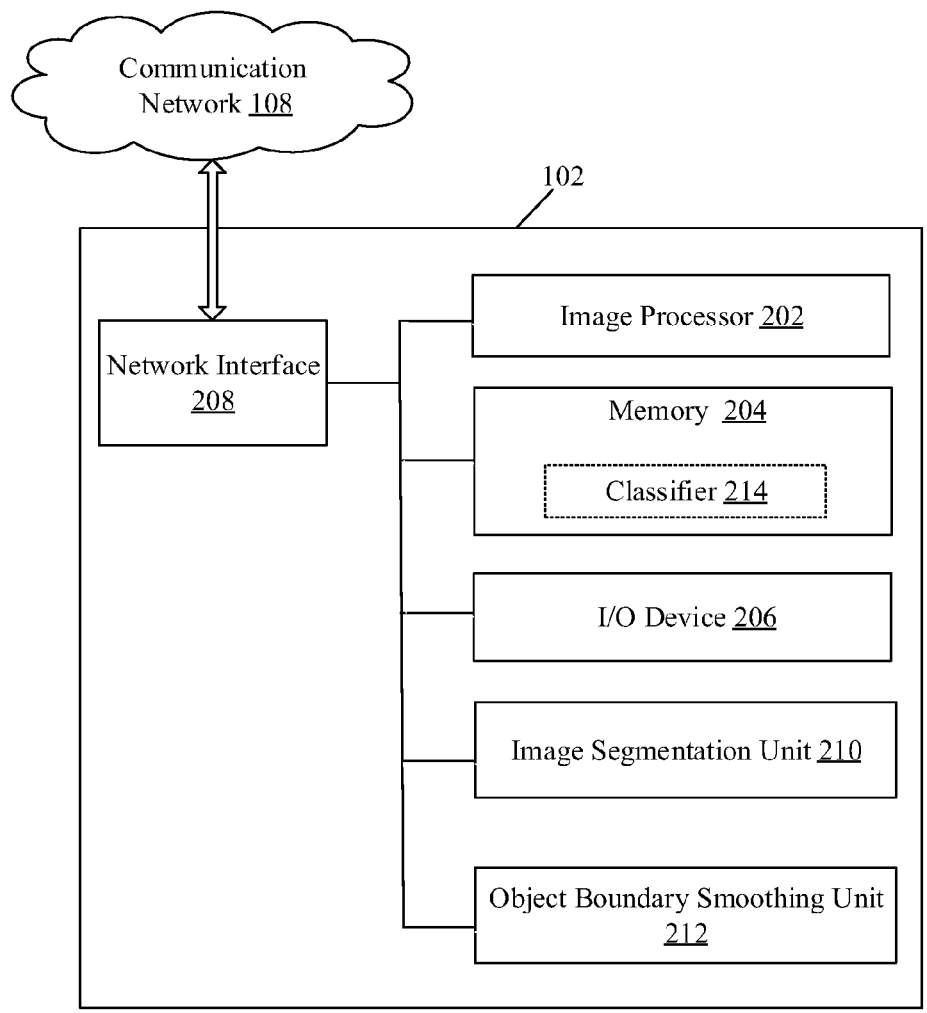
FIG. 2 is a block diagram that illustrates an exemplary image-processing device, in accordance with an embodiment of the disclosure.

FIG. 2 is a block diagram that illustrates an exemplary image-processing device, in accordance with an embodiment of the disclosure. FIG. 2 is explained in conjunction with elements from FIG. 1. With reference to FIG. 2, the image-processing device 102 may include an image processor 202, a memory 204, one or more input/output (I/O) devices, such as an I/O device 206, a network interface 208, and one or more specialized processing units, such as an image segmentation unit 210, an object boundary smoothing unit 212, and a classifier 214. The I/O device 206 may include the display 110.

The image processor 202 may be communicatively coupled to the memory 204, the I/O device 206, the network interface 208, the image segmentation unit 210, and the object boundary smoothing unit 212. The network interface 208 may communicate with the image capture device 104 under the control of the image processor 202.

The image processor 202 may comprise suitable logic, circuitry, interfaces, and/or code that may be operable to execute a set of instructions stored in the memory 204. The image processor 202 may be configured to provide instructions to the one or more specialized processing units to perform one or more specific operations. The image processor 202 may be implemented based on a number of processor technologies known in the art. Examples of the image processor 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may comprise suitable logic, circuitry, and/or interfaces that may be configured to store a machine code and/or a set of instructions executable by the image processor 202, the image segmentation unit 210, the object boundary smoothing unit 212, and/or the classifier 214. The memory 204 may be configured to temporally store the candidate FG region boundary, the candidate BG region boundary, pixel values, such as the mask values and cost values, of the plurality of pixels within the candidate BG region boundary during the segmentation process. Various image splitting algorithms, such Matlab's "rgb2ind" routine, to split the input color image into several sub-regions, may also be stored in the memory 204. Examples of implementation of the memory 204 may include, but are not limited to, at least one of a Random Access Memory (RAM), Read Only Memory (ROM), Electrically Erasable Programmable Read-Only Memory (EEPROM), Hard Disk Drive (HDD), a Solid-State Drive (SSD), a solid state memory, a CPU cache, a Secure Digital (SD) card, or their various combination.

The I/O device 206 may comprise suitable logic, circuitry, interfaces, and/or code that may be configured to receive an input from the one or more users, such as the user 112. The I/O device 206 may be further configured to provide an output to the one or more users. The I/O device 206 may comprise various input and output devices that may be operable to communicate with the image processor 202. Examples of the input devices may include, but are not limited to, a touch screen display, such as the display 110, image sensors, physical input buttons, a microphone, and/or a gesture tracking sensor. Examples of the output devices may include, but are not limited to, the display 110, a projection, and/or a speaker.

The network interface 208 may comprise suitable logic, circuitry, interfaces, and/or code that may be configured to communicate with an external device, such as the server 106, via the communication network 108. The network interface 208 may implement known technologies to support wired or wireless communication with the communication network 108. The network interface 208 may include, but is not limited to, an antenna, a frequency modulation (FM) network interface, a radio frequency (RF) network interface, one or more amplifiers, a tuner, one or more oscillators, a digital signal processor, a coder-decoder (CODEC) chipset, a subscriber identity module (SIM) card, and/or a local buffer. The network interface 208 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The image segmentation unit 210 may comprise suitable logic, circuitry, interfaces, and/or code that may be configured to split the input color image into several sub-regions, such as the candidate FG region boundary and the candidate BG region boundary. The image segmentation unit 210 may be configured to estimate the size and shape of the FG object based on a result of the object boundary smoothing unit 212. The image segmentation unit 210 may be further configured to estimate a number of colors around a user-selected point in the selected FG object based on the result of the object boundary smoothing unit 212. The image segmentation unit 210 may also segment the selected FG object from the BG of the input color image using the smooth object boundary generated by the object boundary smoothing unit 212.

The object boundary smoothing unit 212 may comprise suitable logic, circuitry, interfaces, and/or code that may be configured to generate a smooth object boundary of the FG object. The one or more specialized processing units, such as the image segmentation unit 210 and the object boundary smoothing unit 212 may be implemented as a separate processor or circuitry in the image-processing device 102. In accordance with an embodiment, the one or more specialized processing units and the image processor 202 may be implemented as an integrated processor or a cluster of processors that perform the functions of the one or more specialized processing units and the image processor 202, collectively. In accordance with an embodiment, the one or more specialized processing units may be implemented as a set of instructions stored in the memory 204, which upon execution by the image processor 202, may perform the functions and operations of the image-processing device 102.

The classifier 214 may comprise suitable logic and/or code that may be configured to categorize a pixel as BG or FG. The classifier 214 may refer to a statistical or a mathematical model that may be implemented as a software module that may be stored in the memory 204. In accordance with an embodiment, the object boundary smoothing unit 212 and/or the image processor 202 may be configured to communicate its output to the classifier 214. Examples of the one or more techniques that may be utilized to train the classifier 214 during the segmentation process, include but are not limited to, at least one of a Support Vector Machine (SVM), a Logistic Regression, a Bayesian Classifier, a Decision Tree Classifier, a Copula-based Classifier, a K-Nearest Neighbors (KNN) Classifier, or a Random Forest (RF) Classifier, or combination thereof.

In operation, the image capture device 104 may be configured to capture the input color image. In accordance with an embodiment, the image processor 202 may receive the input color image to be processed from the server 106, by use of the network interface 208. Alternatively, in accordance with an embodiment, the source of the input color image may be pre-stored images or video in the memory 204. Thus, it is to be understood that the source of the input color image may vary. The input color image may be rendered on the display 110 by the image processor 202.

The image-processing device 102 may be configured to receive a user input to enable selection of the FG object in the input color image. In accordance with an embodiment, the user 112 may provide an input via a user interface rendered on the display 110 to switch ON or OFF a smoothening feature, in the image-processing device 102. Alternatively, the smoothening feature to smoothen an object boundary of the selected FG object in the input color image, by the image segmentation unit 210, may be enabled by default. Based on a user-selected point on the FG object, the image processor 202 may be configured to estimate a candidate FG region boundary and a candidate BG region boundary in the input color image. The candidate FG region boundary may include the selected FG object. An example of the estimation of the candidate FG region boundary and the candidate BG region boundary is shown and described in the FIGS. 3B and 3C. The image processor 202 may communicate the estimated candidate FG region boundary and the candidate BG region boundary to the object boundary smoothing unit 212.

The object boundary smoothing unit 212 may be configured to utilize a local pixel analysis window to analyze different pixels in one or more regions in the input color image. The object boundary smoothing unit 212 may determine a frequency of occurrence of FG pixels with respect to BG pixels for the plurality of pixels within the local pixel analysis window in the input color image. In accordance with an embodiment, the functionalities or operations performed by the image-processing device 102, as described in FIG. 1 may be performed by the image processor 202, the image segmentation unit 210, and/or the object boundary smoothing unit 212. Other operations performed by the image processor 202, the image segmentation unit 210, and/or the object boundary smoothing unit 212 may be understood from the description in the FIGS. 3A to 3G, 4 and 5.

Figure 3A:
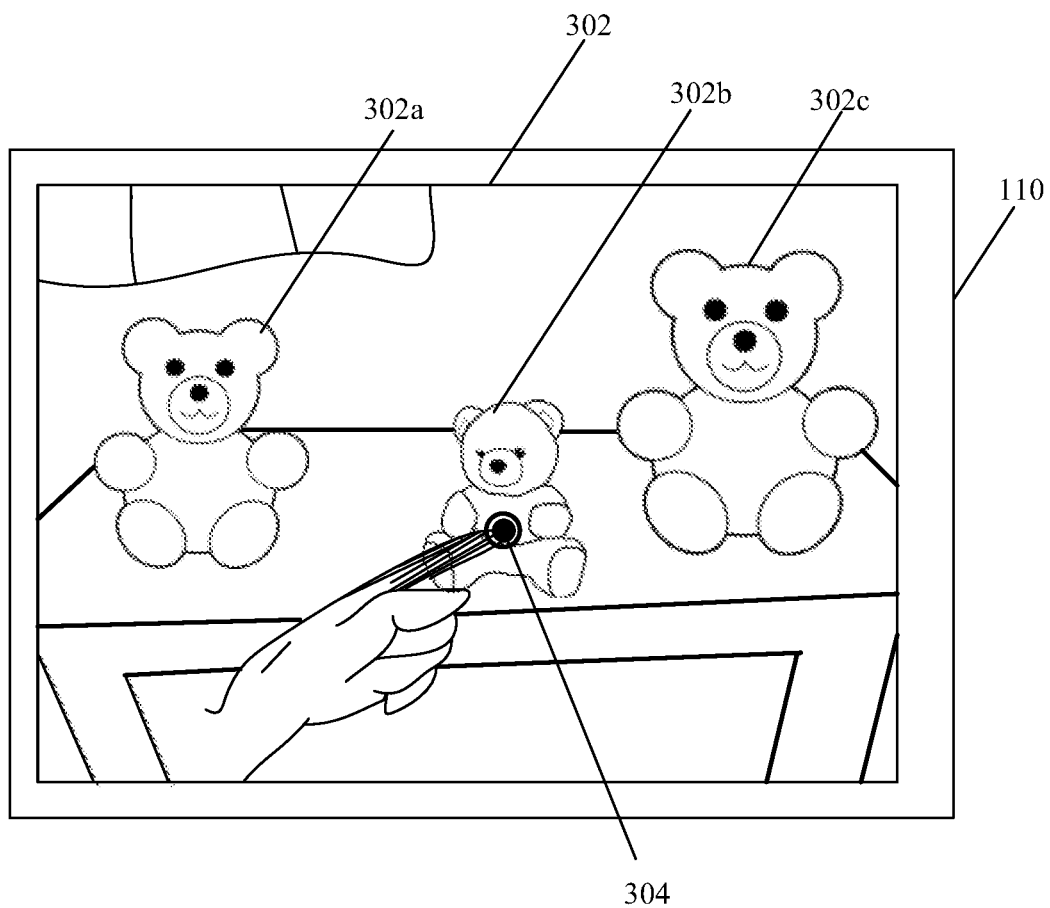
FIGS. 3A to 3G, collectively illustrate a first exemplary scenario for implementation of the disclosed system and method for object boundary smoothening for image segmentation, in accordance with an embodiment of the disclosure.
Figure 3B:
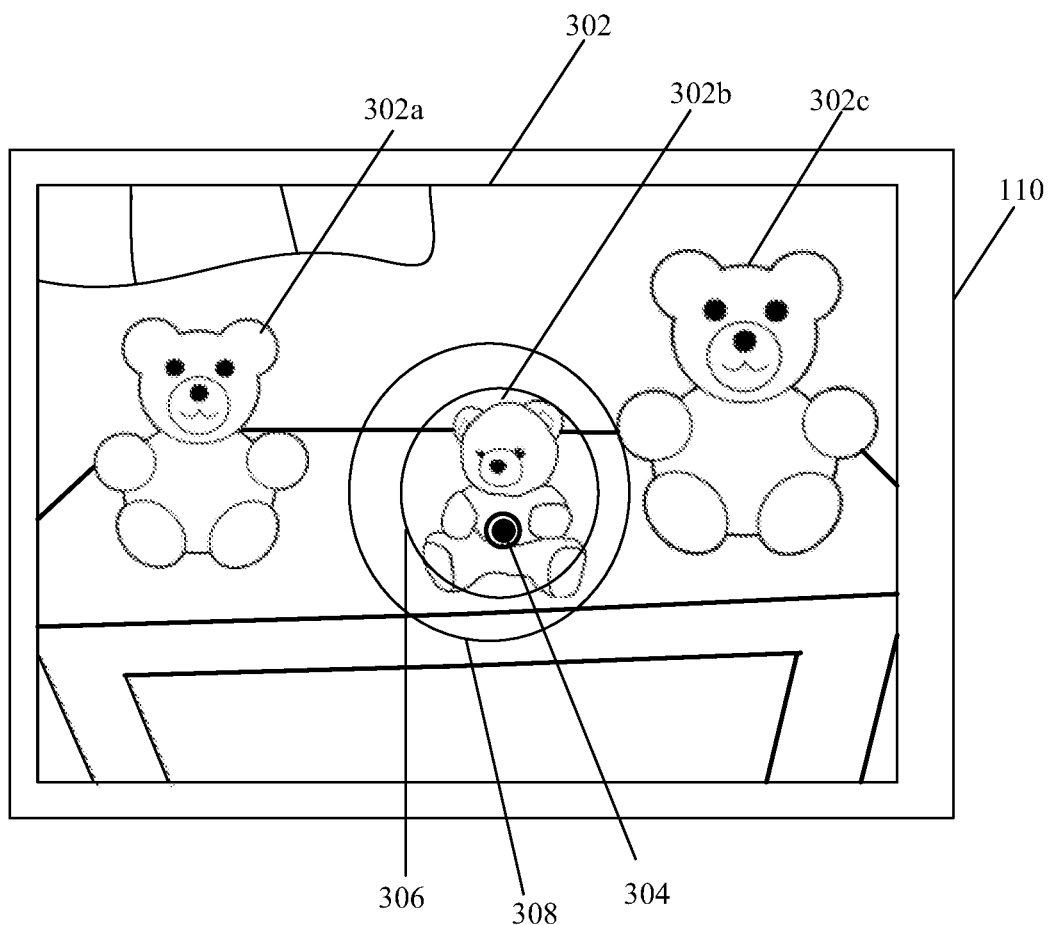

FIGS. 3A to 3G, collectively, illustrate a first exemplary scenario for implementation of the disclosed system and method for object boundary smoothening for image segmentation, in accordance with an embodiment of the disclosure. FIGS. 3A to 3D are explained in conjunction with elements from FIG. 1 and FIG. 2. With reference to FIG. 3A, there is shown an image 302 rendered on the display 110 of the image-processing device 102. The image 302 may be captured by the image capture device 104 (FIG. 1). The image 302 may include a plurality of non-human objects, such as a first toy 302a, a second toy 302b, and a third toy 302c. In accordance to the first exemplary scenario, the image 302 may correspond to the input color image. The image processor 202 may be configured to receive a touch input at a certain point, such as a user-selected point 304, on the FG object, such as the second toy 302b, of the image 302.

With reference to FIG. 3B, there is further shown a candidate FG region boundary 306 and a candidate BG region boundary 308 in the image 302 of FIG. 3A. The candidate FG region boundary 306 may be an imaginary boundary marked around the user-selected point 304 in the image 302. The candidate FG region boundary 306 may include the FG object, such as the second toy 302b, to be segmented out of the plurality of non-human objects. The candidate FG region boundary 306 may be an initial estimate of possible FG boundary of the FG object, such as the second toy 302b, and may also denote a possible size of the second toy 302b. The candidate BG region boundary 308 may surround the candidate FG region boundary 306. The image segmentation unit 210 may be configured to estimate the candidate FG region boundary 306 and the candidate BG region boundary 308 in the image 302.

Figure 3C:
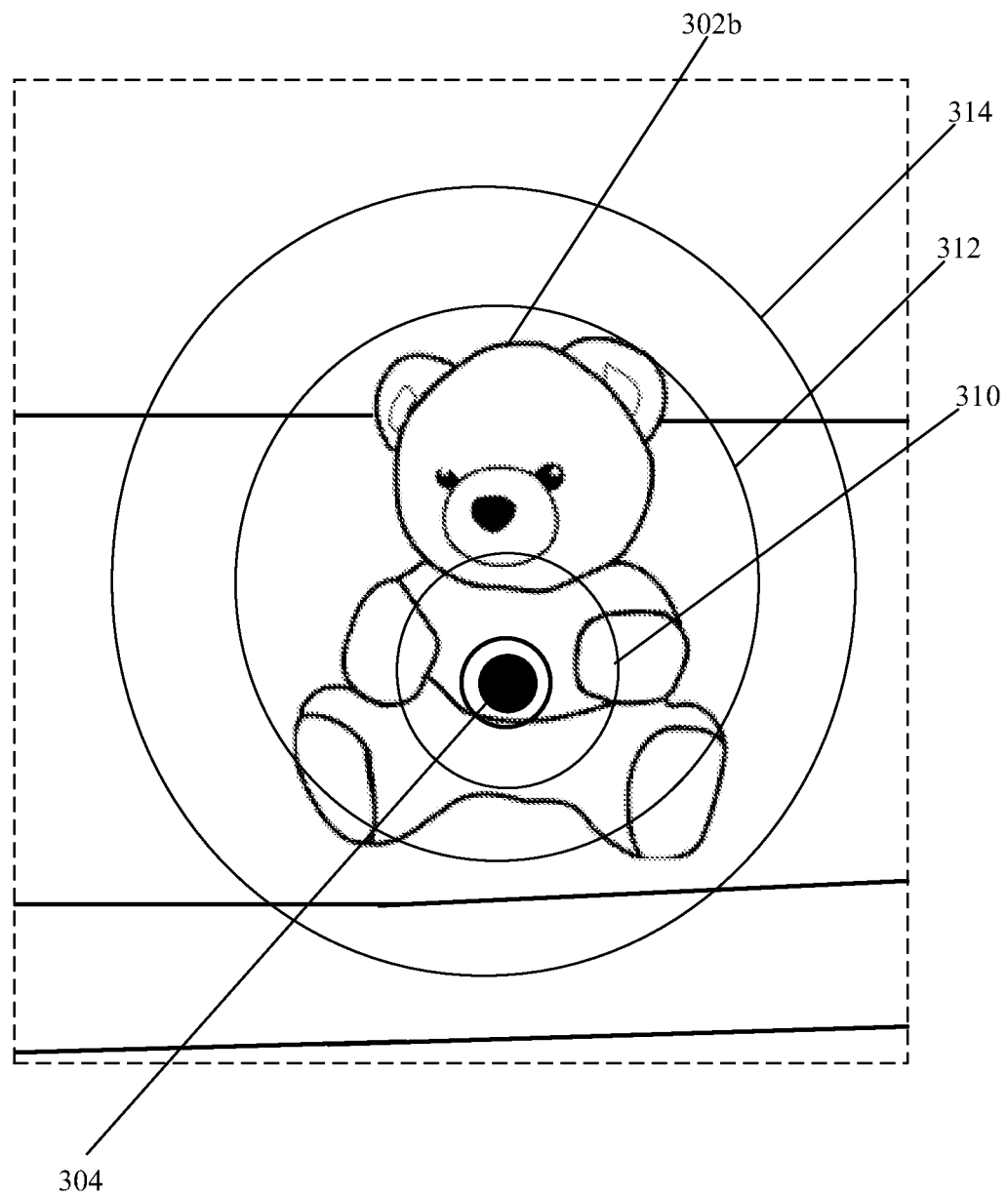

FIG. 3C illustrates an exemplary technique for estimation of the candidate FG region boundary 306 and the candidate BG region boundary 308. With reference to FIG. 3C, there is shown a first sub-region 310, a second sub-region 312, a third sub-region 314, and the user-selected point 304 on the image 302. The image segmentation unit 210 may initially split the image 302 into several sub-regions, such as the first sub-region 310, the second sub-region 312, and the third sub-region 314. For instance, the image 302 may be subjected to image quantization using Matlab's "rgb2ind" routine to split the image 302 into several sub-regions. The first sub-region 310 may be an initial estimate of the possible FG boundary, which may be less than, equal or nearly half of the finger mark size of the user 112 who have provided the user input.

The first sub-region 310 may be categorized as definite FG as it is the nearest surrounding region around the touch input, i.e. the user-selected point 304. In the first sub-region 310 which is nearest to the user-selected point 304, the likelihood that the pixels belong to BG is much less or negligible. The second sub-region 312 may be an initial estimate of the object size of the second toy 302b. The second sub-region 312 may be demarcated by an estimate of the complete finger mark size of the user 112 around the user-selected point 304.

The third sub-region 314 may an initial estimate of the BG boundary, which may be two or more time the size of the complete finger mark size of the user 112 around the user-selected point 304. The third sub-region 314 may be further away from the user-selected point 304, as shown. In accordance with an embodiment, the region lying outside the third sub-region 314 may be a definite BG for the image-processing device 102 as the likelihood that the pixels belong to FG is minimal or negligible. Thus, based on the user-selected point 304 and the finger mark of the user 112 who provides the user input to select the second toy 302b, the image 302 may be split into several sub-regions. The second sub-region 312 may be registered as the candidate FG region boundary 306 that include the FG object, such as the second toy 302b, to be segmented. Similarly, the third sub-region 314 may be registered as the candidate BG region boundary 308.

Figure 3D:
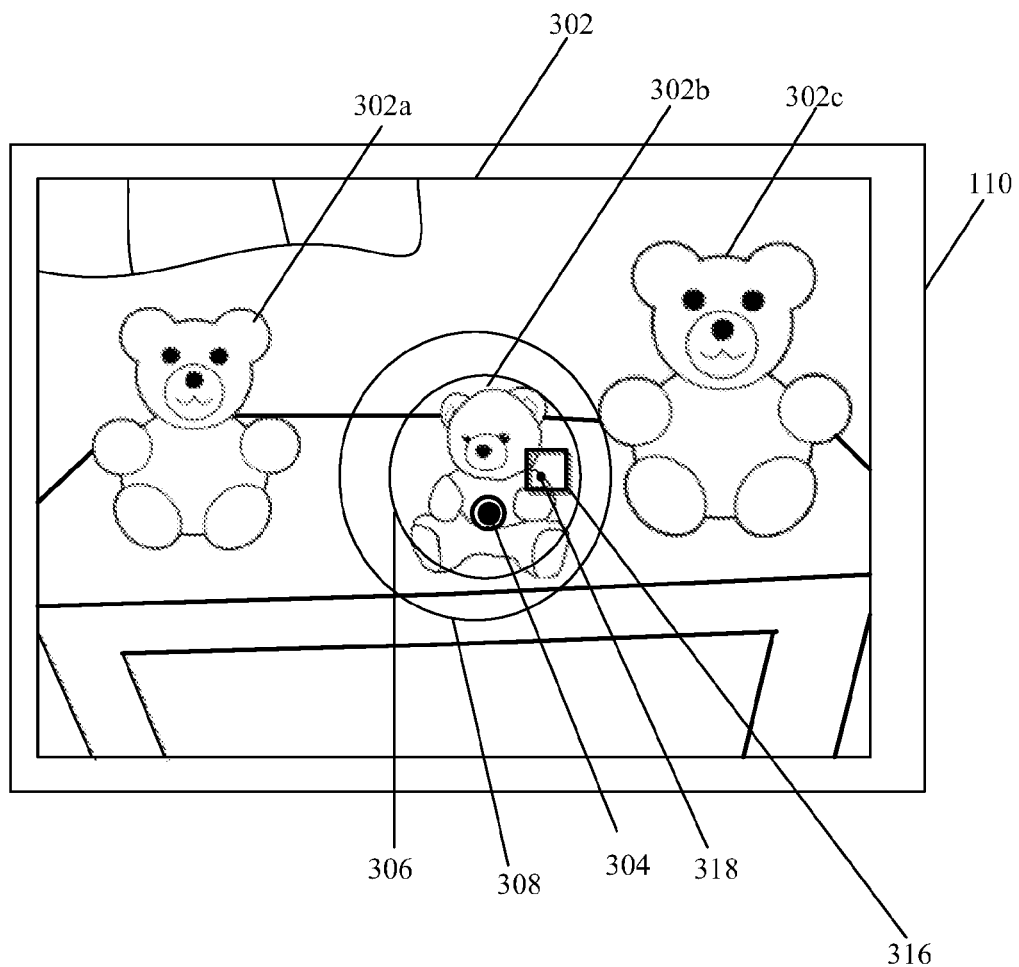

With reference to FIG. 3D, there is shown a local pixel analysis window 316 positioned in a certain region, such as a first region, within the candidate FG region boundary 306 of the image 302. The object boundary smoothing unit 212 may be configured to utilize the local pixel analysis window 316 to analyze different pixels locally in various regions in the image 302 within the candidate FG region boundary 306 and/or the candidate BG region boundary 308. The local pixel analysis window may be a moving window of a specified size such as a "5×5" pixels window in this case.

In accordance with an embodiment, the object boundary smoothing unit 212 may be configured to receive the estimated candidate FG region boundary 306 and the candidate BG region boundary 308 from the image segmentation unit 210. The object boundary smoothing unit 212 may be configured to determine a frequency of occurrence of FG pixels with respect to BG pixels for a plurality of pixels within the local pixel analysis window 316. The local pixel analysis window 316 may be centered at the position of the pixel "x", such as the first pixel 318, as shown. The first pixel 318 may be validated for a correct mask value, i.e. either BG or FG.

In accordance with an embodiment, the object boundary smoothing unit 212 may be configured to control the FG/BG pixel decision by applying user-defined costs, $C_{fb}$ and $C_{bf}$ to the classifier 214. The classifier 214 may decide correct mask value of the first pixel 318 (the current unknown pixel "x") as the FG if:

$$\frac{C_{bf} p(X \mid H_{fore}) p(H_{fore})}{C_{fb} p(X \mid H_{back}) p(H_{back})} > 1, \tag{1}$$

Where $C_{fb}$ is the first cost value that corresponds to the cost of mislabeling a flag value of the unknown pixel "x", such as the first pixel 318, as FG in an event that the BG is true;

$C_{bf}$ is the second cost value that corresponds to the cost of mislabeling a flag value of the unknown pixel "x", such as the first pixel 318, as BG in an event that the FG is true; and p refers to a probability of the pixel "x" belonging to FG or BG.

The object boundary smoothing unit 212 may be configured to select one first cost value $C_{fb}$ and one second cost value $C_{bf}$ for the first pixel 318 based on the determined frequency of occurrence of the FG pixels with respect to the BG pixels for the plurality of pixels, as described above. In accordance with an embodiment, the local pixel analysis window 316 may validate each pixel for the correct mask value in the first region and other regions within the candidate FG region boundary 306 and/or the candidate BG region boundary 308 of the image 302. It is statistically reasonable to estimate that the first pixel 318, such as the unknown pixel "x", is likely FG if there are many FG pixels around it. Thus, the second cost value $C_{bf}$ may be selected larger than the first cost value $C_{fb}$ to increase the likelihood that the first pixel 318 is categorized as FG in an event that the determined frequency of occurrence of FG pixels is larger with respect to BG pixels in the local pixel analysis window 316. Similarly, the second cost value $C_{bf}$ may be selected smaller than the first cost value $C_{fb}$ to increase the likelihood that the first pixel 318 is categorized as BG in an event that the determined frequency of occurrence of FG pixels is smaller with respect to BG pixels in the local pixel analysis window 316. Once the segmentation is started, it may be automatically decided, which region the pixels within the candidate FG region boundary 306 and/or the candidate BG region boundary 308 belong to either the FG or the BG.

In accordance with an embodiment, the object boundary smoothing unit 212 may be configured to apply a sigmoid function for the selection of the first cost value $C_{fb}$ and the second cost value $C_{bf}$. The sigmoid function is provided in the mathematical expressions (2) and (3), given below.

$$C_{bf} = \frac{1}{1+\exp\left\{-\frac{N_f - N/2}{\theta}\right\}};\quad (2)$$

and $$C_{fb} = 1 - C_{bf} \quad (3)$$

where $N_f$ and N refer to the number of FG pixels and the total number of pixels respectively in the local pixel analysis window 316, and θ is the control parameter of the sigmoid.

Figure 3E:
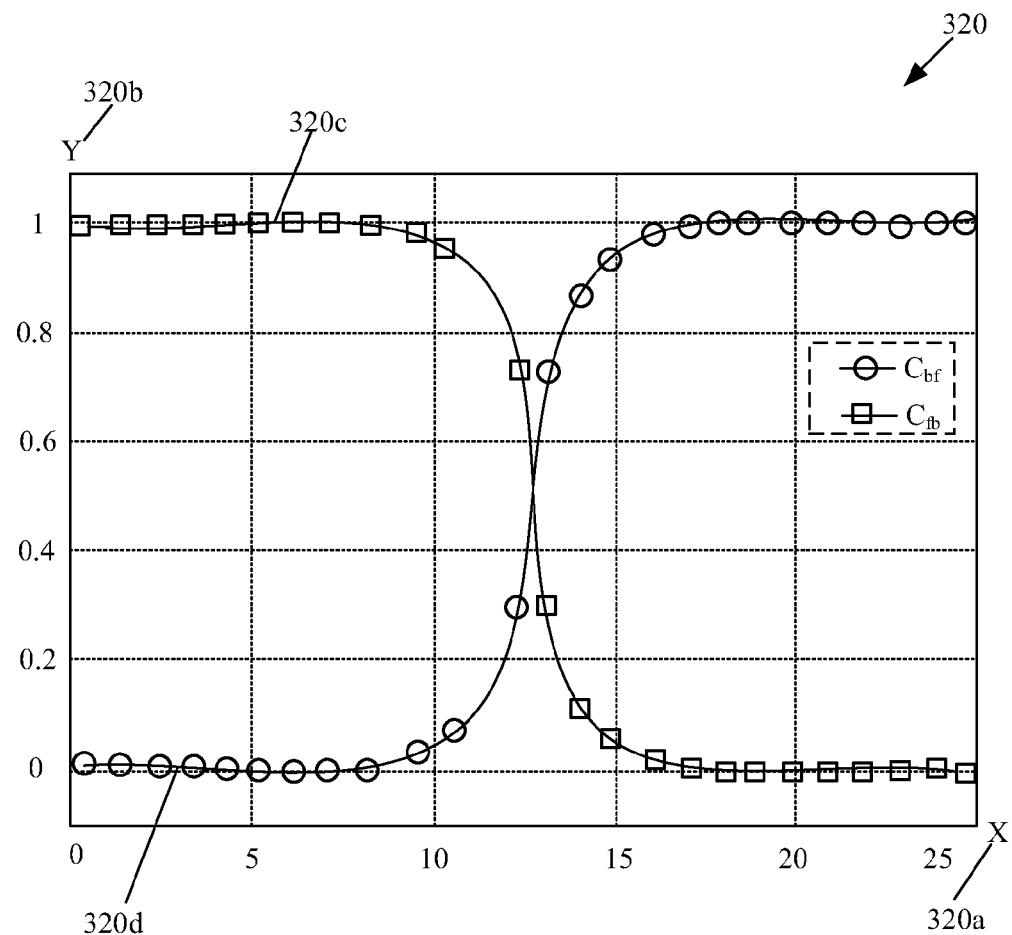

FIG. 3E illustrates a graphical representation 320 to depict the first cost value $C_{fb}$ and the second cost value $C_{bf}$ for the object boundary smoothing of an object. In this case, the object corresponds to the second toy 302b (FIG. 3A). With reference to FIG. 3E, X-axis 320a represents the number of FG pixels, such as 5, 10, 15, 20, and 25, and Y-axis 320b represents the cost values within the range of 0 to 1, such as 0, 0.2, 0.4, 0.6, 0.8, and 1, in accordance to the mathematical expression (3). There is also shown two "S" shaped curves, such as a first sigmoid curve 320c and a second sigmoid curve 320d. The first sigmoid curve 320c refers to the pixels with first cost value $C_{fb}$ and the second sigmoid curve 320d refers to the same pixels with the second cost value $C_{bf}$. In this case, the value of θ is taken as 0.001. As shown in the graphical representation 320, in an event that the first cost value $C_{fb}$ is highest, such as 1, for a pixel within the local pixel analysis window 316, such as a "5×5" window, in the first sigmoid curve 320c, the corresponding second cost value $C_{bf}$ for the same pixel in the second sigmoid curve 320d is lowest, such as 1−1=0, as calculated by applying the mathematical expression (2) and (3). Thus, the second cost value $C_{bf}$ for the first pixel 318 may be selected larger, such as 1, than the first cost value $C_{fb}$, such as 0, to increase the likelihood that the first pixel 318 is categorized as FG in an event that the determined frequency of occurrence of FG pixels is larger with respect to BG pixels in the local pixel analysis window 316.

In accordance with an embodiment, the object boundary smoothing unit 212 may be further configured to identify the first mask value to be updated to the second mask value or vice-versa for each pixel located in the first region and the other regions using the local pixel analysis window 316. The first mask value and the second mask value may correspond to one of the FG mask value and the BG mask value. Such identification and update to correct the mask value within the candidate FG region boundary 306 and the candidate BG region boundary 308 may be a result of the selection of the appropriate cost values, such as the first cost value $C_{fb}$ and the second cost value $C_{bf}$. By selecting appropriate cost values locally using the local pixel analysis window 316 during the segmentation process, the classifier 214 becomes capable of smoothing the object boundary of the selected object, such as the second toy 302b.

Figure 3F:
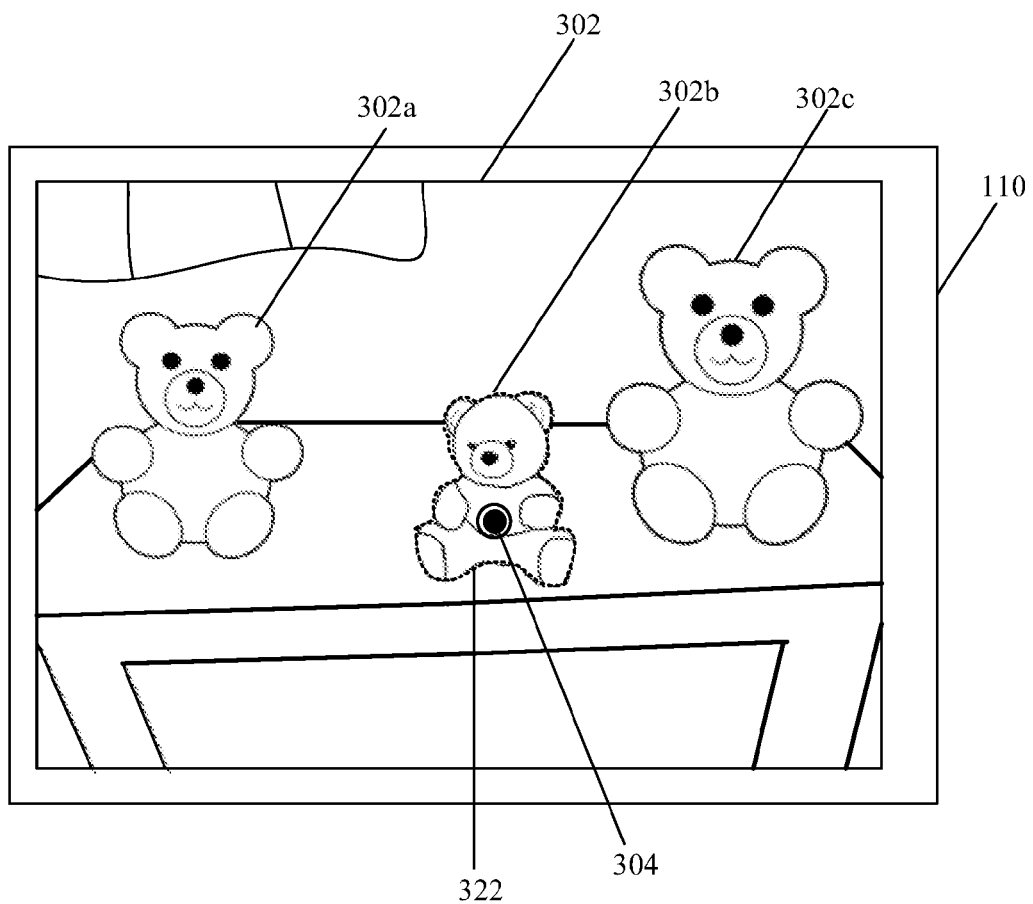

With reference to FIG. 3F, there is shown results of object boundary smoothing for the second toy 302b, such as an object boundary 322. In accordance with an embodiment, the object boundary smoothing unit 212 may be configured to generate the object boundary 322 for the second toy 302b (a FG object). The object boundary 322 may be generated based on the selected first cost values and the second cost values for each pixel locally within the within the candidate FG region boundary 306 and/or the candidate BG region boundary 308 by use of the local pixel analysis window 316. The generated object boundary 322 may represent a smoothened object boundary of the user selected FG object, such as the second toy 302b. In accordance with an embodiment, the image processor 202 may be configured to render the generated object boundary 322 on the display 110. The image segmentation unit 210 may be configured to estimate the size and shape of the FG object, such as the second toy 302b, and/or color information of pixels around the user-selected point 304 in the second toy 302b extending to the periphery of the estimated candidate FG region boundary 306 and/or the candidate BG region boundary 308. The user selected FG object, such as the second toy 302b, may be dynamically segmented from the BG of 302 using the generated object boundary 322.

Figure 3G:
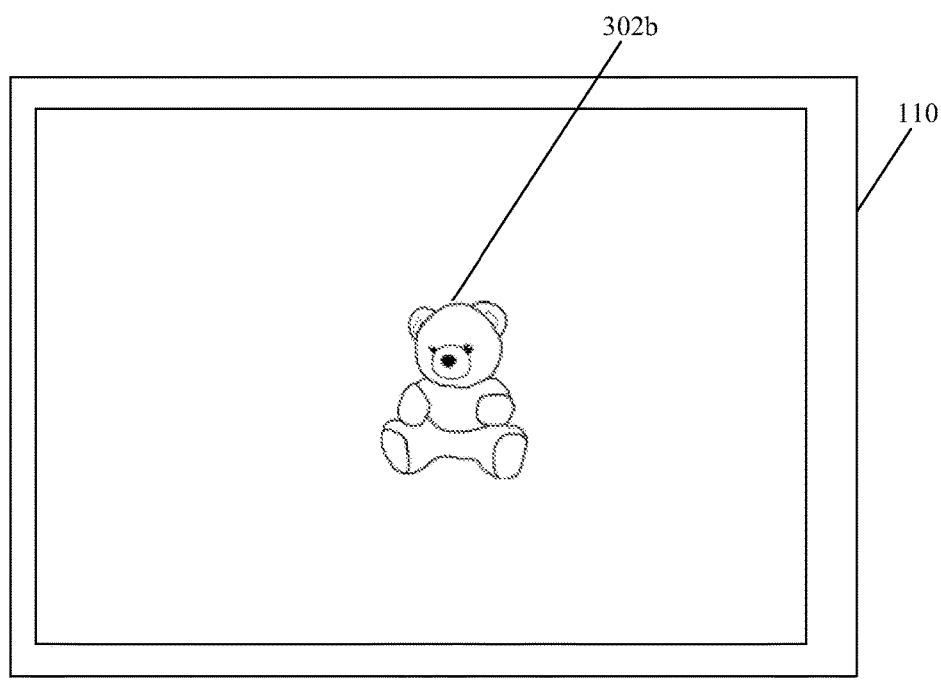

With reference to FIG. 3G, there is shown a segmented object, such as the second toy 302b, based on a single user input, such as the user-selected point 304 on the image 302 (FIG. 3A). The second toy 302b located around the user-selected point 304 may be segmented instantly, by the image segmentation unit 210, by use of the generated object boundary 322 (FIG. 3F) based on a single user input. No additional user-inputs may be requested. The image processor 202 may be configured to render the segmented FG object, such as the second toy 302b, from the image 302 on the display 110. Thus, as a result of the improved and fast object boundary smoothing (represented by the object boundary 322) by the object boundary smoothing unit 212, the image segmentation unit 210 becomes capable of precise segmentation the FG object, such as the second toy 302b in a faster computation time. Consequently, the segmented second toy 302b due to its smooth boundary may be more visually appealing to a viewer as compared to output of conventional segmentation approaches. The precisely segmented FG objects provides enhanced viewing experience when such segmented objects are overlaid on other images or video in virtual reality applications. The precisely segmented FG objects may also be used to provide enhanced viewing experience of a live view of a physical and real-world environment through a camera, such as the image capture device 104. The live view of the physical and real-world environment as viewed through the camera may be augmented by the precisely segmented FG objects to provide additional information in augmented reality and/or mixed reality applications.

Figure 4:
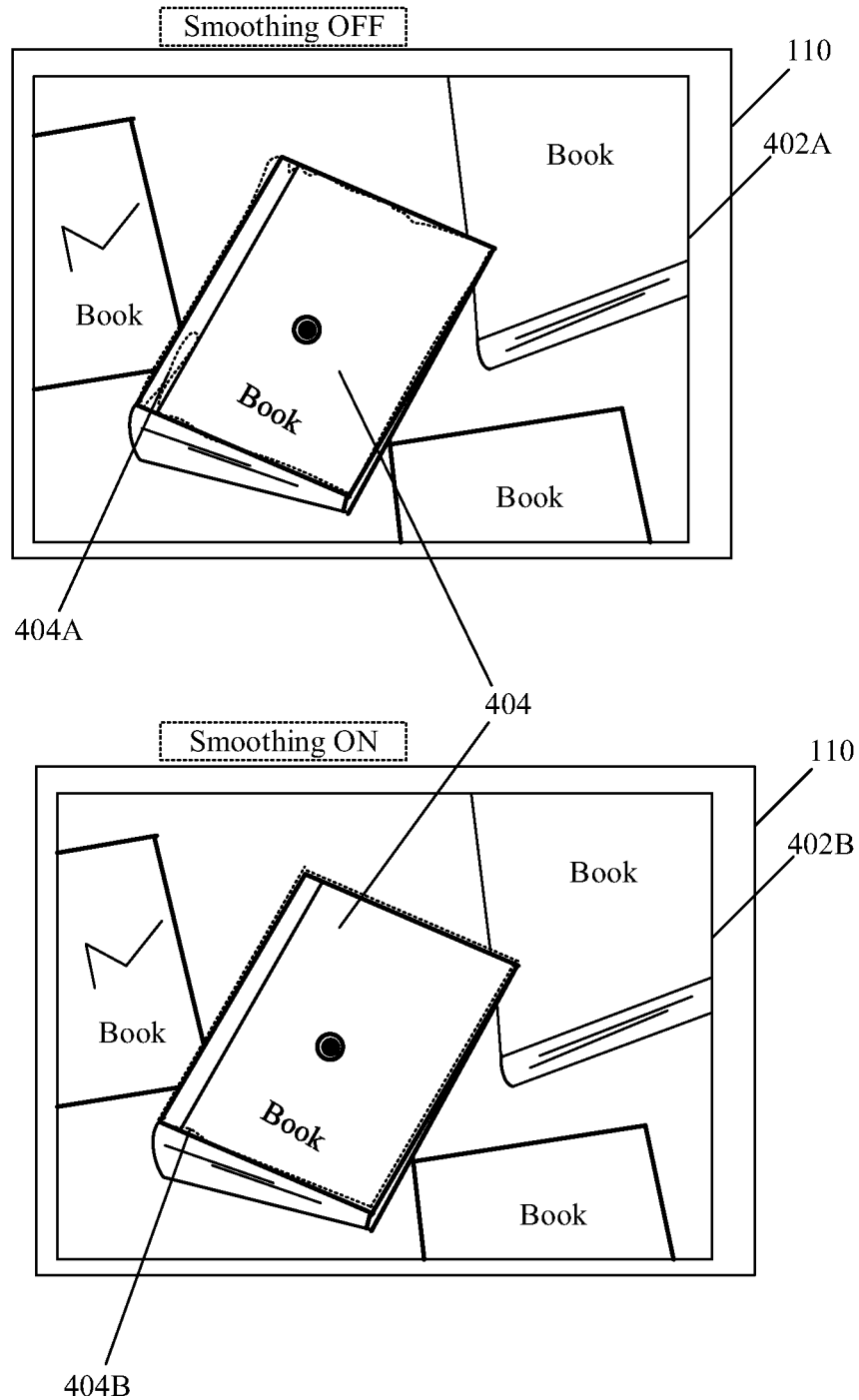
FIG. 4 illustrates a second exemplary scenario for implementation of the disclosed system and method for object boundary smoothening for image segmentation, in accordance with an embodiment of the disclosure.

FIG. 4 illustrates a second exemplary scenario for implementation of the disclosed system and method for object boundary smoothening for image segmentation, in accordance with an embodiment of the disclosure. FIG. 4 is explained in conjunction with elements from FIGS. 1, 2, and 3A to 3G. With reference to FIG. 4, there is shown a first image 402A and a second image 402B that includes a same captured scene. Both the first image 402A and the second image 402B include a plurality of FG objects, such as books, placed in a cluttered environment. There is shown a first object boundary 404A of a book 404 in the first image 402A and a second object boundary 404B of the book 404 in the second image 402B.

In accordance to the second exemplary scenario, the user 112 may provide an input via a user interface render on the display 110 to switch ON or OFF a smoothening feature, in the image-processing device 102. The first image 402A depicts a result of the generated boundary, such as the first object boundary 404A, in an event that the smoothening feature is switched OFF. The object boundary smoothing unit 212 in such a case may not apply the cost values during the segmentation process. The second image 402B depicts a result of the generated boundary, such as the second object boundary 404B, in an event that the smoothening feature is switched ON. The object boundary smoothing unit 212 in such a case may apply the cost values during the segmentation process, as described in the FIGS. 1, 2 and FIG. 3A to 3G. The second object boundary 404B may be smoother than the first object boundary 404A. In an event that the smoothening feature is switched ON and a single touch input is provided on the book 404, the book 404 may be instantly segmented by the image segmentation unit 210 by use of the second object boundary 404B. The output segmented object, such as the book 404, by use of the second object boundary 404B may be visually appealing.

Figure 5:
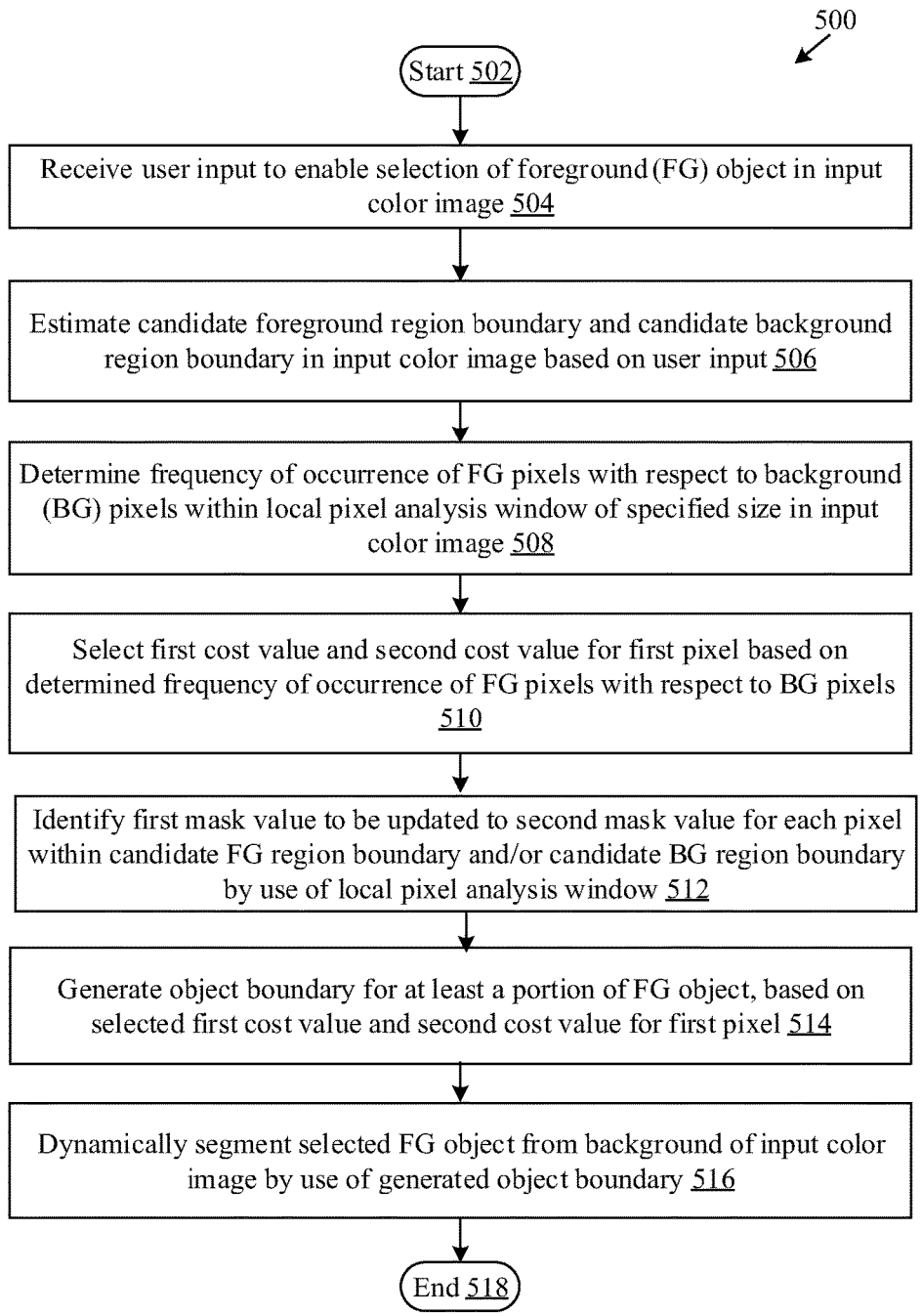
FIG. 5 is a flowchart that illustrates an exemplary method for object boundary smoothening for image segmentation, in accordance with an embodiment of the disclosure.

FIG. 5 is a flowchart that illustrates an exemplary method for object boundary smoothening for image segmentation, in accordance with an embodiment of the disclosure. With reference to FIG. 5, there is shown a flowchart 600. The flowchart 400 is described in conjunction with FIGS. 1, 2, 3A to 3G, 4A, and 4B. The method, implemented at the image-processing device 102, starts at 502 and proceeds to 516.

At 504, a user input may be received, by an image-processing device, to enable selection of a FG object in the input color image. The FG object to be segmented may be selected by a user, such as the user 112, by providing an input on the display 110. An example is shown and described in FIG. 3A, where the image processor 202 receives a touch input at a certain point, such as a user-selected point 304, on the FG object, such as the second toy 302b, of the image 302.

At 506, a candidate FG region boundary and a candidate BG region boundary may be estimated in the input color image based on the user input. The candidate FG region boundary may comprise the FG object and may be located within the candidate BG region boundary that surrounds the candidate FG region boundary. An example of the candidate FG region boundary 306 and the candidate BG region boundary 308 is shown and described in FIGS. 3B and 3C. A local pixel analysis window, such as the local pixel analysis window 316, may be utilized to analyze different pixels in one or more regions within the candidate FG region boundary and the candidate BG region boundary in the input color image.

At 508, a frequency of occurrence of FG pixels may be determined with respect to BG pixels for the plurality of pixels within the local pixel analysis window of a specified size in the input color image. The local pixel analysis window may be a moving window of the specified size to analyze different pixels in a first region in the input color image. The local pixel analysis window may be positioned in the first region of the input color image to encompass a first pixel to be validated for the correct mask value corresponding to BG or FG.

At 510, a first cost value and a second cost value may be selected for the first pixel based on the determined frequency of occurrence of the FG pixels with respect to the BG pixels for the plurality of pixels. The first cost value may correspond to a cost of mislabeling a flag value of the first pixel as FG in an event that the BG is true. The second cost value may correspond to a cost of mislabeling a flag value of the first pixel as BG in an event that the FG is true. The first cost value and the second cost value has been described in details in FIGS. 3D and 3E.

At step 512, a first mask value to be updated to a second mask value may be identified for each pixel located in the first region or other regions by use of the local pixel analysis window. The identification of the pixels located in the first region or other regions within the candidate FG region boundary and/or the candidate BG region boundary in the input color image, may be based on a result of the selection of the first cost value and the second cost value for the first pixel and other pixels within the first region or the other regions.

At 514, an object boundary may be generated for at least a portion of the FG object, based on the selected first cost value and the second cost value for the first pixel. Similarly, a complete object boundary may be generated based on the selected first cost value and the second cost value for all pixels within the candidate FG region boundary and the candidate BG region boundary in the input color image. The generated object boundary may represent a smoothened object boundary for the portion and other portions of the FG object as a result of the selection of the first cost value and the second cost value for each pixel using the local pixel analysis window. An example of the generated object boundary 322 for the second toy 302b is shown in the FIG. 3F.

At 516, the selected FG object may be dynamically segmented from a BG of the input color image by use of the generated object boundary. An example of the segment object, such as the second toy 302b, is shown in the FIG. 3G. The control may pass to end 518.

In conventional segmentation approaches, the FG objects may be segmented out from BG image based on the decision taken for each pixel within an image or a sequence of images. With the current segmentation approaches, it may not be possible to precisely segment the FG object without knowing the size, shape, and/or the number of colors related to the FG object. Further, in a cluttered scene, where there are multiple objects with same or similar size, shape, and/or colors in a captured image, the problem of automatic or nearly automatic segmentation of a desired object increases manifold. The determination of the frequency of occurrence of FG pixels with respect to BG pixels within the local pixel analysis window, such as the local pixel analysis window 316, by the object boundary smoothing unit 212, may be advantageous. The local analysis of pixel values within the local pixel analysis window enables to make a statistically reasonable estimation that a certain unknown pixel "x", may be likely FG if there are many FG pixels are around it.

In accordance with an embodiment, the selection of the first cost value and the second cost value by the object boundary smoothing unit 212, within the candidate FG object boundary and/or the candidate BG boundary using the local pixel analysis window may also be advantageous. Instead of selecting the cost values prior to the segmentation process, the object boundary smoothing unit 212 selects appropriate cost values during the segmentation process. By selecting the cost values locally using the local pixel analysis window, the image-processing device 102 becomes capable of smoothing an object boundary to be segmented accurately and at a faster computation time. Thus, as a result of the improved and fast object boundary smoothing by the object boundary smoothing unit 212, the image segmentation unit 210 becomes capable of precise segmentation the FG object, such as the second toy 302b, in a faster computation time. Consequently, the segmented second toy 302b due to its smooth boundary may be more visually appealing to a viewer as compared to output of conventional segmentation approaches. Thus, an improvement in the technology of digital image processing, such as an improved FG-BG segmentation, to precisely segment the FG object without knowing the size, shape, and/or the number of colors related to the FG object, is provided. One or more circuits, such as the image processor 202, the object boundary smoothing unit 212, the image segmentation unit 210, and the classifier 214, provides a capability to the image-processing device 102 to instantly smoothen the object boundary of the FG object based on a user-selected point on the FG object. The image-processing device 102 becomes capable to precisely segment the user-selected FG object in real time or near real-time based on a single user input. No additional user-inputs may be requested.

Various embodiments of the disclosure may provide a non-transitory, computer-readable storage medium, and/or a non-transitory machine-readable medium stored thereon, a machine code and/or a set of instructions with at least one code section executable by a machine and/or a computer for image processing for object boundary smoothening for image segmentation. The at least one code section may cause the machine and/or computer to perform the operations that comprise receiving, by one or more circuits of the image-processing device 102, a user input to enable selection of a FG object in an input color image. A frequency of occurrence of FG pixels with respect to BG pixels may be determined for a plurality of pixels within a local pixel analysis window of a specified size in the input color image. The local pixel analysis window may be positioned in a first region of the input color image to encompass at least a first pixel to be validated for a correct mask value corresponding to BG or FG. A first cost value and a second cost value may be selected for the first pixel based on the determined frequency of occurrence of the FG pixels with respect to the BG pixels for the plurality of pixels. An object boundary may be generated for a portion the FG object, based on at least the selected first cost value and the second cost value for the first pixel. These operations performed by the computer may improves the functioning of the computer itself to instantly smoothen the object boundary of the FG object based on the user-selected point on the FG object. Further, in an event that such operations are performed by the one or more circuits, such as the image processor 202, the object boundary smoothing unit 212, the image segmentation unit 210, the ability of the image-processing device 102 to instantly smoothen the object boundary of the FG object and precisely segment the FG object, is improved.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An image processing system, comprising:
one or more circuits configured to:
receive a user input on an input color image, wherein said user input corresponds to a user-selected point on said input color image;
select a foreground (FG) object in the input color image based on said received user input;
divide said input color image into a plurality of sub regions based on said user-selected point;
determine a frequency of occurrence of FG pixels with respect to background (BG) pixels for a plurality of pixels within a local pixel analysis window of a specified size in said input color image;
position said local pixel analysis window in a first region of said plurality of sub regions to encompass at least a first pixel of said first region, wherein a candidate foreground region boundary of said first region is an imaginary boundary demarcated around said user-selected point in said input color image;

validate said first pixel for a correct mask value corresponding to one of a BG mask value or a FG mask value based on said local pixel analysis window;

select a first cost value and a second cost value for said validated first pixel based on said determined frequency of occurrence of said FG pixels with respect to said BG pixels for said plurality of pixels; and generate an object boundary for a first portion of said FG object, based on at least said selected first cost value and said second cost value for said first pixel.

2. The image processing system according to claim 1, wherein said generated object boundary represents a smoothened object boundary for said first portion and for a plurality of second portions of said FG object as a result of said selection of said first cost value and said second cost value for each of said plurality of pixels in said first region based on said local pixel analysis window.

3. The image processing system according to claim 1, wherein said local pixel analysis window is a moving window of said specified size to analyze said plurality of pixels in at least said first region in said input color image.

4. The image processing system according to claim 1, wherein said one or more circuits are further configured to estimate said candidate foreground region boundary and a candidate background region boundary in said input color image based on said user input, wherein said first region is located within at least one of said candidate foreground region boundary or said candidate background region boundary.

5. The image processing system according to claim 4, wherein said candidate foreground region boundary comprises said FG object and said FG object is located within said candidate background region boundary that surrounds said candidate foreground region boundary.

6. The image processing system according to claim 4, wherein said one or more circuits are further configured to estimate at least one of a size of said FG object, a shape of said FG object or color information of pixels, around said user input, that extends to a periphery of said estimated candidate foreground region boundary.

7. The image processing system according to claim 1, wherein said first cost value corresponds to a cost of a flag value of said first pixel that is mislabeled as FG based on said BG mask value that is true, and wherein said second cost value corresponds to said cost of said flag value of said first pixel that is mislabeled as BG based on said FG mask value that is true.

8. The image processing system according to claim 7, said selected second cost value is larger than said first cost value to increase a likelihood that said first pixel is categorized as said FG based on said determined frequency of occurrence of said FG pixels that is larger with respect to BG pixels in said local pixel analysis window.

9. The image processing system according to claim 7, said selected second cost value is smaller than said first cost value to increase a likelihood that said first pixel is categorized as said BG based on said determined frequency of occurrence of said FG pixels that is smaller with respect to BG pixels in said local pixel analysis window.

10. The image processing system according to claim 1, wherein said one or more circuits are further configured to:
apply a sigmoid function to each of said plurality of pixels in said first region for selection of said first cost value and said second cost value based on said local pixel analysis window; and obtain a complete object boundary of said selected FG object based on said application of said sigmoid function.

11. The image processing system according to claim 1, wherein said one or more circuits are further configured to:
identify a first mask value for each of said plurality of pixels located in said first region; and
update said first mask value to a second mask value based on said local pixel analysis window, wherein said first mask value and said second mask value corresponds to one of said FG mask value or said BG mask value.

12. The image processing system according to claim 1, wherein said one or more circuits are further configured to dynamically segment said selected FG object from a BG object of said input color image based on said generated object boundary and a classifier.

13. The image processing system according to claim 1, wherein said one or more circuits are further configured to:
determine said first region, a second region and a third region of said plurality of sub regions based on said user-selected point,
wherein said first region, said second region and said third region surround said user-selected point, in this order.

14. An image processing method, comprising:
receiving, by one or more circuits of an image processing device, a user input on an input color image, wherein said user input corresponds to a user-selected point on said input color image;
selecting, by said one or more circuits, a foreground (FG) object in an input color image based on said received user input;
dividing, by said one or more circuits, said input color image into a plurality of sub regions based on said user-selected point;
determining, by said one or more circuits, a frequency of occurrence of FG pixels with respect to background (BG) pixels for a plurality of pixels within a local pixel analysis window of a specified size in said input color image;
positioning, by said one or more circuits, said local pixel analysis window in a first region of said plurality of sub regions to encompass at least a first pixel of said first region, wherein a candidate foreground region boundary of said first region is an imaginary boundary demarcated around said user-selected point in said input color image;
validating, by said one or more circuits, said first pixel for a correct mask value corresponding to one of a BG mask value or a FG mask value based on said local pixel analysis window;
selecting, by said one or more circuits, a first cost value and a second cost value for said validated first pixel based on said determined frequency of occurrence of said FG pixels with respect to said BG pixels for said plurality of pixels; and
generating, by said one or more circuits, an object boundary for a first portion of said FG object, based on at least said selected first cost value and said second cost value for said first pixel.

15. The image processing method according to claim 14, wherein said generated object boundary represents a smoothened object boundary for said first portion and for a plurality of portions of said FG object as a result of said selection of said first cost value and said second cost value for each of said plurality of pixels in said first region based on said local pixel analysis window.

16. The image processing method according to claim 14, wherein said local pixel analysis window is a moving window of said specified size to analyze said plurality of pixels in at least said first region in said input color image.

17. The image processing method according to claim 14, further comprising estimating, by said one or more circuits, said candidate foreground region boundary and a candidate background region boundary in said input color image based on said user input, wherein said first region is located within at least one of said candidate foreground region boundary or said candidate background region boundary.

18. The image processing method according to claim 17, wherein candidate foreground region boundary comprises said FG object and said FG object is located within said candidate background region boundary that surrounds said candidate foreground region boundary.

19. The image processing method according to claim 17, further comprising estimating, by said one or more circuits, at least one of a size of said FG object, a shape of said FG object or color information of pixels, around said user input, extending to a periphery of said estimated candidate foreground region boundary.

20. The image processing method according to claim 14, wherein said first cost value corresponds to a cost of a flag value of said first pixel that is mislabeled as FG based on said BG mask value that is true, and wherein said second cost value corresponds to said cost of said flag value of said first pixel that is mislabeled as BG based on said FG mask value that is true.

21. The image processing method according to claim 20, said second cost value is selected larger than said first cost value to increase a likelihood that said first pixel is categorized as said FG based on said determined frequency of occurrence of said FG pixels that is larger with respect to BG pixels in said local pixel analysis window.

22. The image processing method according to claim 20, said selected second cost value is smaller than said first cost value to increase a likelihood that said first pixel is categorized as said BG based on said determined frequency of occurrence of said FG pixels that is smaller with respect to BG pixels in said local pixel analysis window.

23. The image processing method according to claim 14, further comprising:
applying, by said one or more circuits, a sigmoid function to each of said plurality of pixels in said first region for selection of said first cost value and said second cost value based on said local pixel analysis window; and
obtaining, by said one or more circuits, a complete object boundary of said selected FG object based on said application of said sigmoid function.

24. The image processing method according to claim 14, further comprising:
identifying, by said one or more circuits, a first mask value for each pixel located in said first region; and
updating, by said one or more circuits, said first mask value to a second mask value based on said local pixel analysis window, wherein said first mask value and said second mask value corresponds to one of said FG mask value or said BG mask value.

25. The image processing method according to claim 14, further comprising segmenting, by said one or more circuits, dynamically, said selected FG object from a BG object of said input color image based on said generated object boundary and a classifier.

26. The image processing system according to claim 13, wherein said one or more circuits are further configured to:
determine a size of said first region which is at least one of less than, equal, or half of a size of said user-selected point;
determine a size of said second region corresponds to at least one of a size of said FG object or a user finger mark size around the user-selected point; and
determine a size of said third region corresponds to at least two times of said user finger mark size.

\* \* \* \* \*